Figure 1:
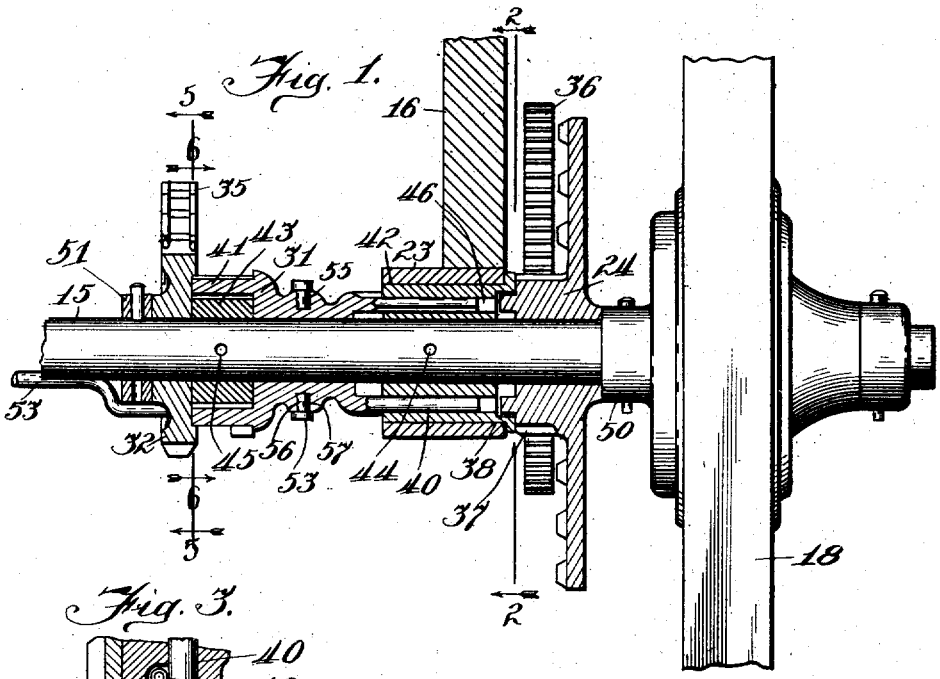

E. C. SMITH.

CLUTCH.

APPLICATION FILED OCT. 16, 1909.

Reissued Jan. 4, 1910.

13,072.

3 SHEETS—SHEET 1.

Witnesses

Milton Genoir

Daisy F. Hughes

Inventor

Ernest C. Smith.

By Gilleon & Gilleon

Attorneys.

E. C. SMITH.

CLUTCH.

APPLICATION FILED OCT. 16, 1909.

Reissued Jan. 4, 1910.

13,072.

3 SHEETS—SHEET 2.

Witnesses

Milton Senoir

Daisy F. Hughes

Inventor

Ernest C. Smith.

By Gillson & Gillson

Attorneys.

E. C. SMITH.
CLUTCH.
APPLICATION FILED OCT. 16, 1909.
Reissued Jan. 4, 1910.
13,072.
3 SHEETS—SHEET 3.
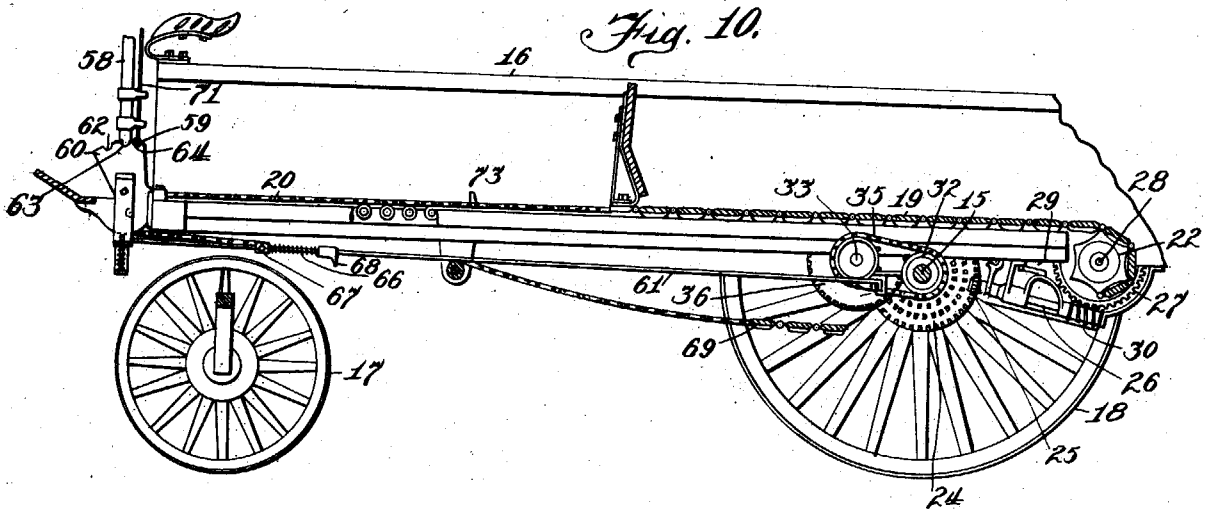
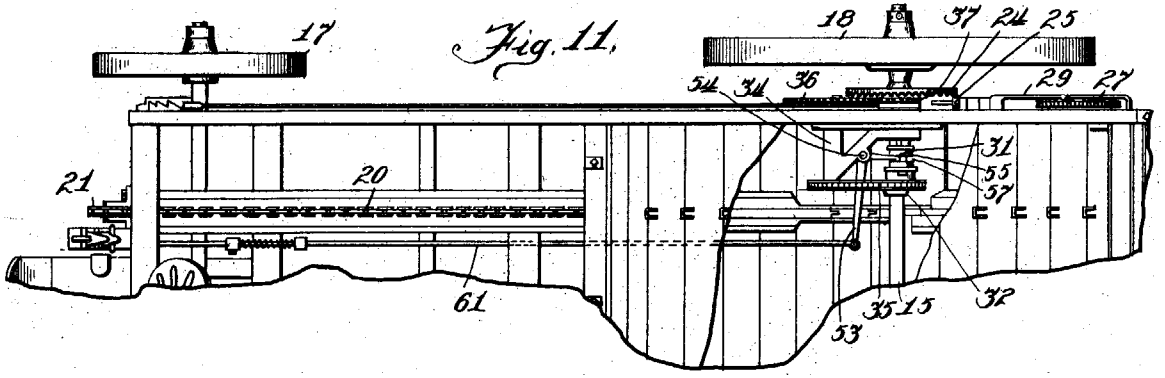
Witnesses
Milton Lenoir
Daisy F. Hughes
Inventor,
Ernest C. Smith.
By Gillson & Gillson
Attorneys.

UNITED STATES PATENT OFFICE.

ERNEST C. SMITH, OF CANTON, ILLINOIS.

CLUTCH.

13,072. Specification of Reissued Letters Patent. Reissued Jan. 4, 1910.

Original No. 916,377, dated March 23, 1909, Serial No. 409,497. Application for reissue filed October 16, 1909. Serial No. 523,086.

*To all whom it may concern:*

Be it known that I, ERNEST C. SMITH, a citizen of the United States, and resident of Canton, county of Fulton, State of Illinois, have invented certain new and useful Improvements in Clutches, of which the following is a specification, and which are illustrated in the accompanying drawings, forming a part thereof.

The invention relates to clutches for use in power transmitting machinery for releasably connecting a rotatably driving and a driven member, and it has been divided out of my co-pending application for patent on fertilizer distributers, Serial Number 287,718, filed November 16, 1905.

More specifically the invention relates to those clutches for releasably connecting a driving and a driven member wherein one of such members is a rotatable shaft and the shiftable member of the clutch is fixed against rotation on the shaft.

Heretofore it has been the customary practice to operatively connect the shaft and shiftable clutch member of devices of this kind by a spline and groove. It is well known, however, that when the members so connected are employed for transmitting great power the spline is caused to bind in the groove, thereby presenting so much frictional resistance to the shifting of the clutch that this is effected with great difficulty and sometimes rendered quite impossible.

A feature of the present invention contemplates a shiftable clutch member slidably mounted upon a driving shaft and fixed against rotation thereon by means of a dog rigidly secured to the shaft and having a slidable engagement with the clutch member.

One of the objects of the invention is to provide a clutch which shall be of simple and efficient construction and so arranged that it may be released from its power transmitting position with but little effort.

A detail of the invention provides a clutch adapted to play between two power transmitting members with either of which it may be separately engaged and having an intermediate position in which it is disengaged from both, while automatic means are provided for shifting the clutch member from one extreme position to the other.

Figure 3:
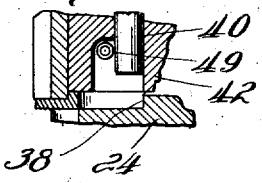
Figure 2:
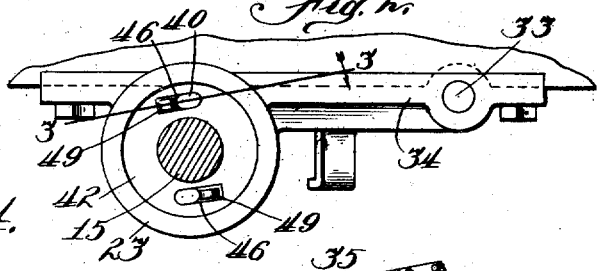
Figure 4:
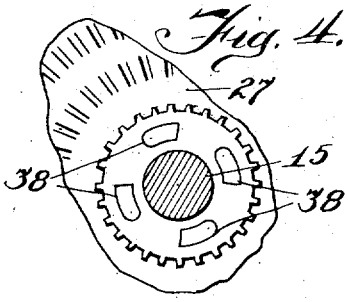
Figure 5:
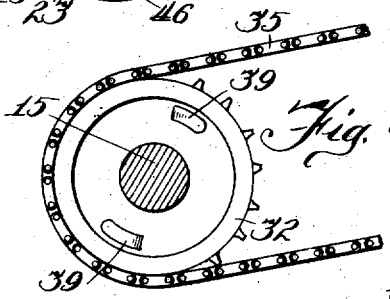
Figure 6:
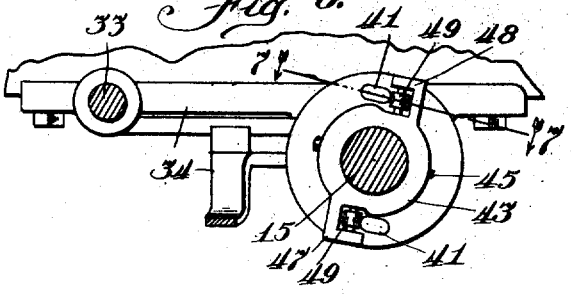
Figure 9:
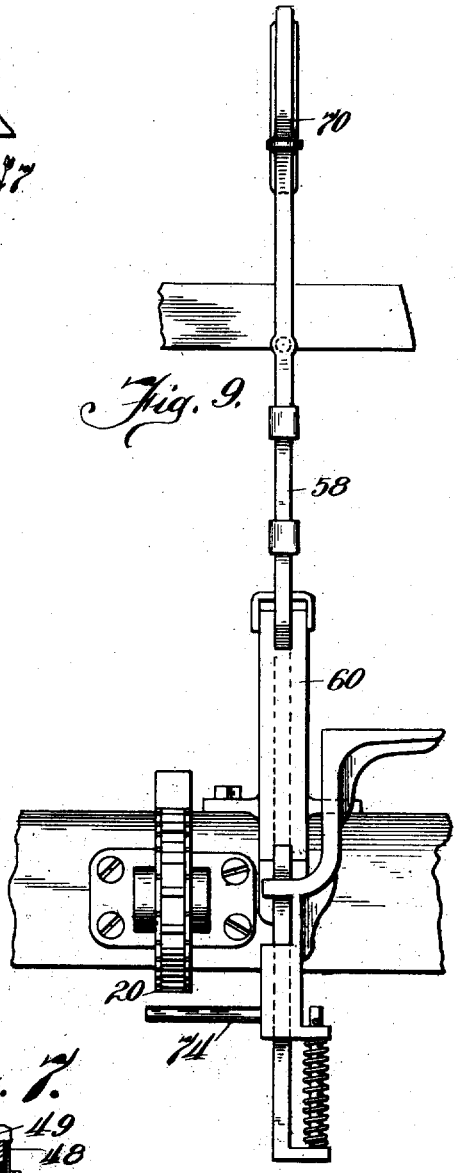
Figure 8:
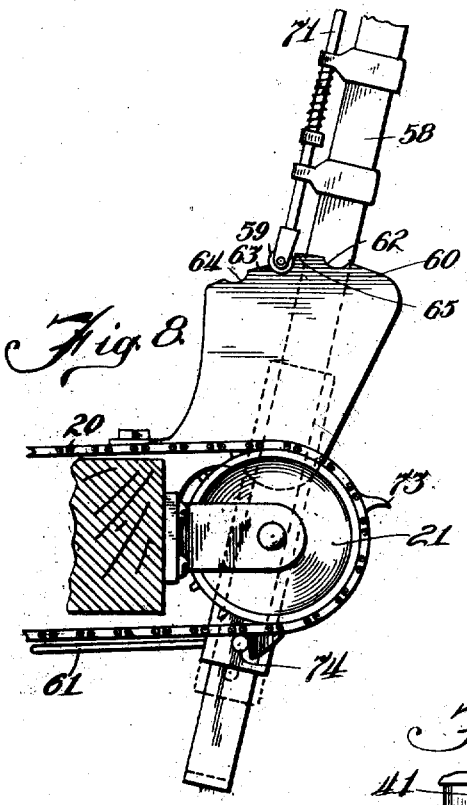
Figure 7:
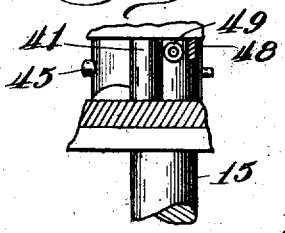

In the accompanying drawings: Figure 1 shows in vertical longitudinal section a clutch embodying the invention; Fig. 2 is a transverse sectional view of the same taken on the line 2—2, of Fig. 1; Fig. 3 is a detail plan section as viewed from the line 3—3, of Fig. 2; Fig. 4 is a detail face view of one of the clutch members; Figs. 5 and 6 are sectional views taken on the line 5—5, Fig. 1, Fig. 6 being viewed from the direction indicated by the arrows designated 6, 6; Fig. 7 is a detail plan sectional view taken on the line 7—7, of Fig. 6; Fig. 8 shows in side elevation a detail of the mechanism provided for shifting the clutch; Fig. 9 is a front elevation of the mechanism illustrated in Fig. 8; Fig. 10 shows in vertical longitudinal section a fertilizer distributer wherein the clutch illustrated in Figs. 1 to 9 inclusive is employed for controlling its operation; and, Fig. 11 is a detail plan view of the distributer illustrated in Fig. 10.

A detail of a rotatable driving shaft is illustrated in the drawings at 15. As shown, this shaft is the rear axle of a fertilizer distributer like that described in my application for patent heretofore mentioned, out of which this invention has been divided. The distributer comprises a hopper 16 having front and rear carrying wheels designated 17, 18 respectively, and a movable bottom 19. The bottom of the hopper is carried by endless chains 20 each turning over sprockets 21, 22 adjacent the front and rear ends of the hopper and the axle 15 extends transversely beneath the hopper where it is journaled in bearing blocks, as 23, and is rotated by the rear carrying wheels for moving the hopper bottom 19 when the distributer is drawn over the ground. The operative connection between the driving shaft 15 and the hopper bottom 19 comprises a variable speed gear 24, which, as shown, is loosely mounted on the driving shaft adjacent the hub of one of the carrying wheels 18 and a worm shaft 26 which is journaled in a bracket 29 secured to the hopper frame and carries a gear pinion 25 for engaging the variable speed gear 24 and a worm 30 for engaging a worm wheel 27 mounted on a shaft 28 which carries the sprocket wheels 22 at the rear of the hopper.

The clutch provided by the invention is employed in the apparatus just described for establishing a driving connection between the shaft 15 and the variable speed gear 24 for turning the gear in either direction. As shown, a shiftable clutch member 31 loosely mounted on the shaft 15 is provided and is adapted to play between the hub of the variable speed gear 24 for directly connecting this gear to the shaft and a sprocket wheel 32. The sprocket wheel 32 has gear connection with the variable speed gear 24 for reversely rotating it, comprising a countershaft 33 journaled in the bracket 34 adjacent the driving shaft 15 and operatively connected with the sprocket 32 by a sprocket chain 35 and with the variable speed gear 24 through a gear 36 mounted on the countershaft and meshing with gear teeth formed upon the hub of the variable speed gear. Clutch teeth 38 and 39 most clearly shown in Figs. 4 and 5 of the drawings are formed upon the hub of the variable speed gear 24 and upon the face of the sprocket wheel 32, respectively, and clutch fingers 40 and 41 are provided upon the ends of the shiftable clutch member 31 for engaging these clutch teeth.

A dog rigidly secured to the driving shaft 15 is employed for reacting upon the shiftable clutch member 31 to rotate it with the driving shaft. Preferably two such dogs are provided one for engaging the clutch fingers 40 and 41 at each end of the clutch member 31. As shown, these dogs are secured to the driving shaft 15 by pins, as 44 and 45. The dog 42 is most clearly shown in Figs. 1 and 2 of the drawings and preferably takes the form of bushing surrounding the driving shaft 15 and turning within the bearing block 23. As shown it is provided with apertures 46 for receiving the clutch fingers 40. The dog 43 is most clearly shown in Figs. 1 and 6 of the drawings and preferably takes the form of a collar which incloses the shaft 15 and is provided with arms 47, 48 for bearing upon the clutch fingers 41 of the shiftable clutch member. In order to facilitate the shifting of the clutch, the apertures 46 provided in the bushing 42 for receiving the clutch fingers 40 and the arms 47, 48 formed upon the dog 43 for engaging the clutch fingers 41 are provided with anti-friction rollers 49.

The variable speed gear 24 and the sprocket wheel 32, while normally free to rotate on the driving shaft 15 are fixed against longitudinal movement thereon, the former being secured in position by the hub 50 of the adjacent carrying wheel 18 and by the bushing 42 and the latter by the dog 43 and a collar 51 pinned to the shaft adjacent the farther side of the sprocket wheel. Preferably the shiftable clutch member 31 is of such length that it may be moved between the variable speed gear 24 and the sprocket wheel 32 to engage either separately or to an intermediate position in which it is disengaged from both. As shown, a shipper member 53 which preferably takes the form of a bell crank lever pivotally attached to the bracket 34 at 54, is provided for shifting the clutch member 31, the shorter arm of the bell crank being of yoke form to straddle the clutch member, and the arms of the yoke being provided with inwardly directed studs 55 and 56 for engaging a circumferential groove 57 formed about the body of the clutch member.

Means are provided for manually shifting the clutch to any one of its positions and automatic means are provided for shifting the clutch from one extreme position to the other. As shown, a hand lever 58, illustrated in detail in Figs. 8 and 9 of the drawings, and having a spring-controlled pawl 59 which plays over a quadrant 60 is provided adjacent the forward end of the machine and is connected by a rod 61 to the free end of the bell crank lever 53. Preferably the pawl 59 takes the form of a roller and the quadrant 60 is provided with rounded notches 62, 63, 64 for receiving the roller, the notches 62, 64 being properly placed upon the quadrant for retaining the hand lever 58 in those positions corresponding to the two extreme positions of the clutch member 31 and the notch 63 being adapted to retain the hand lever in an intermediate position corresponding to the intermediate position of the clutch member 31. In order that the hand lever 58, when rapidly shifted, may be moved in one direction from one extreme position to the other without raising the pawl 59 the notch 63 is guarded at one side by a shoulder 65. For automatically shifting the hand lever 58 with sufficient force to cause the pawl 59 to leap over the notch 63 a spring, as 66, is provided which is adapted to be compressed by a moving part of the machine. As shown, the spring 66 is coiled about the shipper rod 61 and reacts between a stop 67 fixed in position on the shipper rod and a movable contact piece 68 slidably mounted on the shipper rod in the path of the forward edge 69 of the movable hopper bottom. The usual grip lever 70 pivotally attached to the hand lever 58 and connected to the pawl 59 by a rod 71 is provided for lifting the pawl when the lever 58 is to be manually shifted for operating the clutch.

By means of the invention a clutch is provided which may be easily shifted even though great power be transmitted thereby. Each of the dogs 42 and 43 bears directly upon the side of the clutch member 31 in the direction of its rotation and the parts therefore cannot become bound together nor cramped in position by the pressure developed in the transmission of power.

As shown, the clutch member 31 may be automatically shifted out of driving engagement with the variable speed gear to an intermediate position by a stop 73 carried by one of the sprocket chains 20 for engaging a pin 74 provided at the foot of the hand lever 58 and projecting into the path of the stop.

When the contact piece 68 is engaged by the advancing forward edge 69 of the movable hopper bottom, the spring 66 is compressed until it reacts upon the stop 67 with sufficient force to displace the pawl 59 from the forward notch 62 of the quadrant 60. The expansion of the spring 66 then serves to swing the hand lever 58 backwardly with sufficient force to cause the pawl 59 to clear the intermediate notch 63 of the quadrant 60 and to reach the notch 64, whereby the lever is retained in its extreme backward position corresponding to a reversed position of the clutch.

I claim as my invention—

1. In combination, a shaft; a pair of wheels loose on the shaft; a clutch fixed against rotation on the shaft and reciprocable between the wheels; manual means for shifting the clutch to its extreme or intermediate positions; and automatic means for shifting the clutch from one extreme position to the other, including a spring for moving the clutch over the intermediate position, said spring being compressed by a moving part of the mechanism prior to the shifting.

2. In combination, a driving shaft, two wheels loose on the shaft, adjacent faces of the wheels being adapted for engagement by a clutch, a sleeve slidably mounted on the shaft between the wheels and having clutch fingers extending toward each of the wheels, the arrangement being such that when the sleeve occupies its mid-position its clutch fingers are disengaged from both of the wheels, a dog fixed to the shaft between the sleeve and each of the wheels and bearing on the fingers, and automatic means controlled by mechanism driven by the wheels for shifting the sleeve from one extreme position to the other.

3. In combination, a driving shaft, two wheels loose on the shaft, adjacent faces of the wheels being adapted for engagement by a clutch, a sleeve slidably mounted on the shaft between the wheels and having clutch fingers extending toward each of the wheels, the arrangement being such that when the sleeve occupies its mid-position its clutch fingers are disengaged from both of the wheels, a dog fixed to the shaft between the sleeve and each of the wheels and bearing on the fingers, a detent engageable by a moving part of the mechanism driven by the wheels, and elastic connection between the detent and the sleeve.

4. In combination, a shaft, a pair of wheels loose on the shaft, a clutch driven by the shaft and reciprocable between the wheels, a latch for securing the clutch in engagement with one of the wheels, and a spring adapted to be compressed by a moving part driven by the said wheel for releasing the latch and moving the clutch into engagement with the other wheel.

5. In combination, a pair of rotatable members, a clutch driven by one of such members and movable into and out of engagement with the other, a latch for securing the clutch in engagement with the last-named member, and a contact piece adapted to be engaged by a moving part driven by the said last-named member for releasing the latch.

6. In combination, a pair of rotatable members, a clutch driven by one of such members and movable into and out of engagement with the other, a latch for securing the clutch in engagement with the last-named member, and a contact piece adapted to be engaged by a moving part driven by the said last-named member for releasing the latch and moving the clutch.

7. In combination, a pair of rotatable members, a clutch driven by one of such members and movable into and out of engagement with the other, a latch for securing the clutch in engagement with the last-named member, and a spring-returned contact-piece adapted to be engaged by a moving part driven by the said last-named member for releasing the latch.

8. In combination, a pair of rotatable members, a clutch driven by one of such members and movable into and out of engagement with each other, a latch for securing the clutch in engagement with the last-named member, and a spring-returned contact-piece adapted to be engaged by a moving part driven by said last-named member for releasing the latch and moving the clutch.

9. In combination a pair of rotatable members, a clutch driven by one of such members and movable into and out of engagement with the other, a latch for securing the clutch in engagement with the last-named member, and a trip operated by the said last-named member for releasing the latch.

10. In combination a pair of rotatable members, a clutch driven by one of such members, and movable into and out of engagement with the other, a latch for securing the clutch in engagement with the last-named member, and a trip operated by the last-named member for releasing the latch and moving the clutch.

ERNEST C. SMITH.

Witnesses:
W. F. Moore,
Fred. Singleton.